United States Patent

Ludolph et al.

[11] Patent Number: 5,943,053
[45] Date of Patent: Aug. 24, 1999

[54] METHOD AND APPARATUS FOR EXPANDING AND CONTRACTING A WINDOW PANEL

[75] Inventors: Frank E. Ludolph, Menlo Park; Sara J. Swanson, Los Gatos; Chris J. Ryan, Mountain View, all of Calif.

[73] Assignee: Sun Microsystems, Inc., Palo Alto, Calif.

[21] Appl. No.: 08/831,847

[22] Filed: Apr. 1, 1997

[51] Int. Cl.⁶ .................................................. G06F 3/00
[52] U.S. Cl. .................................. 345/342; 345/340
[58] Field of Search ........................... 345/340, 339, 345/341, 342, 343, 344, 345, 346, 347, 348, 333–338, 350, 351, 352, 353–355, 326, 327, 328, 329, 330, 331, 119, 120, 121; 348/564

[56] References Cited

U.S. PATENT DOCUMENTS

| | | | |
|---|---|---|---|
| 5,001,697 | 3/1991 | Torres | 364/521 |
| 5,163,046 | 11/1992 | Hahne et al. | 370/79 |
| 5,226,117 | 7/1993 | Miklos | 345/340 |
| 5,227,771 | 7/1993 | Kerr et al. | 340/731 |
| 5,455,904 | 10/1995 | Bouchet et al. | 345/340 |
| 5,642,131 | 6/1997 | Pekelney et al. | 345/145 |
| 5,657,049 | 8/1997 | Ludolph et al. | 345/145 |
| 5,699,534 | 12/1997 | Barber et al. | 345/334 |
| 5,712,995 | 1/1998 | Cohn | 345/342 |
| 5,715,413 | 2/1998 | Ishai et al. | 345/349 |
| 5,745,096 | 4/1998 | Ludolph et al. | 345/120 |

OTHER PUBLICATIONS

Konicki et al., *Killer Windows™ Utilities*, Que Corp., Carmel, In. pp. 163–167, cl. 6, ch. 15, 1993.

Primary Examiner—Steven P. Sax
Attorney, Agent, or Firm—Beyer & Weaver, LLP

[57] ABSTRACT

A method for expanding and contracting a window panel to uncover the panel's content to the user without resize other panels and without reformatting their content, is described. A user chooses a window panel by moving a pointer to that panel. If there is content in that panel not shown to the user, the panel expands to show the entire content. If expansion is not necessary initially, the system waits to see if any actions by the user require expansion. Upon expansion at any stage, portions of neighboring window panels are covered instead of the neighboring panels contracting and reformatting their content. Once the pointer is moved out of a window panel, the panel contracts to its default or original size and the expansion process occurs for a newly entered panel. Also described is the process of determining the maximum expansion size of a window panel and the "rolling out" and "rolling in" characteristic of the expansion and contraction process.

10 Claims, 8 Drawing Sheets

METHOD AND APPARATUS FOR EXPANDING AND CONTRACTING A WINDOW PANEL

BACKGROUND OF THE INVENTION

1. The Field of the Invention

The present invention relates generally to user interface software run on computers, and specifically to a method and apparatus for expanding the size of a window panel without contracting the size of any adjacent panels and without affecting the content format of any adjacent panels.

2. The Relevant Art

With the advent of the graphical user interface (GUI) on computer systems came the increasingly common use of the window to display information to the user. The data displayed in a window may be of different types. Some may be graphical, such as icons or symbols, or textual, such as a word processing document, or a combination of both. To keep different types of data displayed in a window separate and easily identifiable, a single window can be sectioned where each section contains a particular type of data. These sections are typically referred to as window panels. Thus, a single window may have several window panels. Again, window panels within a single window are useful, for example, if the window contains data that differ in nature (e.g. user menus vs. a database file) or in category (e.g. product information vs. customer information). These are only two examples of why data in a window may be separated or grouped; there may be many other reasons for separating data in a window. Window panels are a useful and convenient tool for sectioning or partitioning a single window and, as such, has become a basic concept in GUI technology.

Window panels have been employed in many capacities and come in many shapes and sizes. In addition to the examples above, window panels are used to contain icons corresponding to functions and utilities, to convey warnings or error messages to a user, to display the status of running applications, to provide menus and directories for a user, or to hold one or more primary work files such as a word processing document, a spreadsheet, or a database.

One type of window panel is a window pane. Where a window panel is used generically to describe a section of a window, a window pane is a type of window panel that contains transitional or non-permanent content. The content in a window pane can change often depending on the user's actions. While window panel can be used to refer to a window pane, a panel also includes sections of a window that contain more permanent data, such as icons and display windows in a tool panel. Another example is a simple horizontal menu bar. This type of data cannot typically be changed or altered by a user and are, in a manner, restricted areas. Normally, the largest sections in a window are window panes but they are also commonly referred to as window panels.

With the increasing use of window panels to separate data in a window and given the limited screen size of display monitors, individual window panels although capable of containing a large amount of data may only be capable of showing the user at any given time a small portion of that data. In other words, the window panel size may be small compared to the amount of data in that window panel.

Some systems presently existing allow a user to "manually" change the size of window panels through the use of push buttons typically located at the corners of the window panel or through the use of scrollbars. By using a pointing device and "pressing" a push button, a user can shrink, expand or move window panels to a desired size or position. The desired size may not always be known and consequently the operation of shrinking or expanding the window panel may have to be performed a number of times before reaching the optimal size. A scrollbar can be used to basically flip through and stop at desired portions of the content in a window panel. If a window is sectioned into many window panels and several of the panels contain data the user needs to do his or her work, the operation of manually changing the size, moving, or scrolling through a window panel can be tedious; akin to shuffling through a stack of paper to find the right document, a time-consuming side activity that interferes with the user's real work.

Some systems will expand and contract a particular window panel automatically when the system determines that the user wants to access that panel. However, in the expansion and contraction process, other window panels are also expanded or contracted, and the contents within those window panels are consequently reformatted and redrawn to fit within the altered window panel. For example, the default size of a window panel may occupy 10% of a total window size and the panel expands to reveal all its content thereby occupying 50% of the window. If there was only one other window panel in that window and the second panel originally occupied 90% of the window and it contained text, after the expansion the second panel would occupy only half the window and the size of the text in that panel would decrease by about 40%.

This decrease may make that text unreadable. Moreover, the decrease in window panel size and the accompanying reformatting and redrawing of all the content in all other affected window panels is a waste of valuable processing resources. Such operations take up time on the computer system's CPU and cause many unnecessary diversions to the system's memory, as well as to other resources, thus slowing down the overall operation of the system. Finally, this type of ripple effect on other window panels from changing the size of one window panel raises visual distraction or "noise" for the user. That is, the disappearance and reappearance of all the content as its being formatted and drawn in the resized window panel.

What is needed is a method and apparatus for adjusting the size of a window panel in which expanding, and similarly contracting, a window panel, for example to uncover hidden content, will not cause other panels to contract, or expand, and is time-efficient, visually appealing, and non-distracting to a computer user.

SUMMARY OF THE INVENTION

Accordingly, the present invention provides a method and apparatus for automatically expanding and contracting the size of a window panel as needed without having to contract and expand other window panels in the vicinity, and is visually appealing and non-distracting in the manner the panel expands and contracts. In one embodiment, a method for changing the default size of a selected window panel within a window displayed on a computer monitor without causing any other window panels in the window to contract or expand is disclosed. In this aspect of the invention, the system detects when a pointer has been stationary within the selected window panel for at least a threshold time period and determines whether the selected window panel is in condition to be expanded. The selected window panel is then enlarged to create an expanded window panel when it is determined that the pointer has been stationary for at least the threshold time period and the selected window panel is in condition to be expanded. The selected panel is enlarged in a manner such that the expanded portion appears to be placed over an adjacent panel or panels such that the adjacent panel(s) in the window do not appear to be contracted in response to the expansion of the selected window panel. When the pointer moves out of the selected panel, the panel is contracted to a default size. In some embodiments, the time period used as the threshold period is in the range of approximately 0.1 to 1.0 seconds.

In one embodiment, the step of determining whether the window panel should be expanded is based at least in part on a determination of whether the selected window panel contains hidden content. In still another embodiment, the step of determining whether a the panel should be expanded is based partly on whether a user's action has created a situation where the selected window panel now contains content that would be hidden at the panel's current size.

In one embodiment, the step of enlarging the selected window panel involves determining the smaller of either the desired expansion size or the maximum permissible expansion size of the selected window, and then enlarging the selected window panel to the smaller of the two.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. On the contrary, it is intended to cover alternatives, modifications, and equivalents as may be included within the spirit and scope of the invention as defined by the appended claims.

Figure 1:
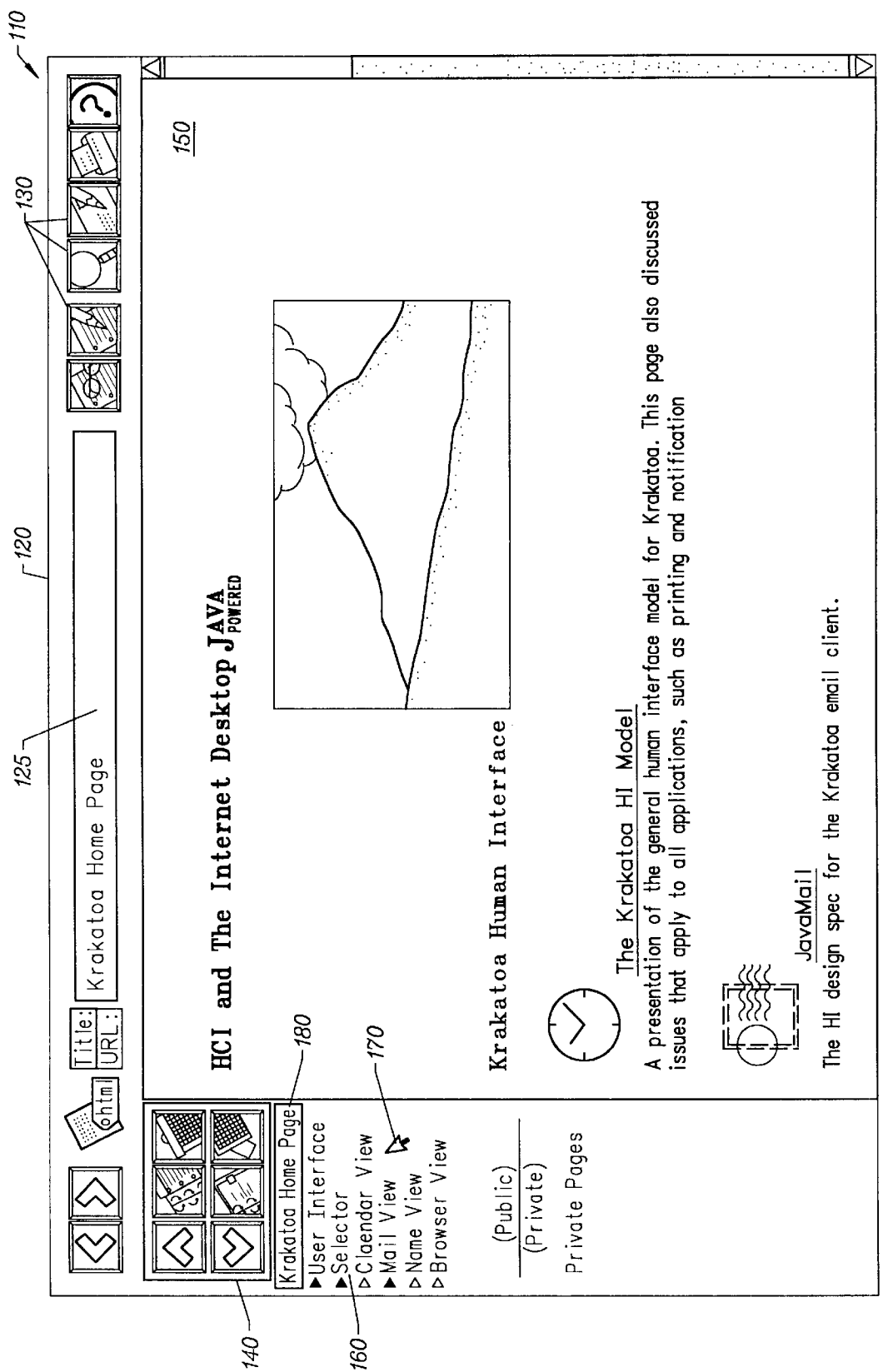
FIG. 1 is an illustration showing a display monitor displaying one window containing a home page of a Web site retrieved by a Web browser. The window is partitioned into three window panels in which the panels are shown at their default or original sizes.

FIG. 1 shows a window 110 containing the home page of a Web site as retrieved by a Web browser. The home page retrieved in FIG. 1 is the "Krakatoa Home Page," a Web site on the World Wide Web. Those having skill in the art will appreciate that the window panel expansion and contraction capabilities of the invention will have utility in other contexts such as operating system software or application software that have windowing capability.

The window 110 shown in FIG. 1 has three window panels of different types. At the top of the window is a window panel 120 that contains options for the user in the form of icons and a display area 125. This type of window panel is a combination display and tool window panel. The icons 130 represent functions the user can perform. Typically this type of window panel contains high-level functions such as "Help" or "Print". Panel 120 also contains a display area 125 that provides the user with information. In the screenshot shown, the display area 125 is informing the user that she is viewing the "Krakatoa Home Page." Because window panel 120 is a tool panel, it normally does not change size in the embodiment shown. The user's actions in these types of panels are generally limited to choosing one of the icons to perform a desired function or scrolling through the contents in the fixed display area. However, tool panels need not be fixed and may be expanded if the default size of the window panel does not show all the icons or functions available to the user. In this context it would be desirable to have window panel 120 expand to show all its contents.

The largest window panel in window 110 is the primary window panel 150. In the embodiment shown, window panel 150 is the user's primary display area or work space. For example, if the user was working on a document in a word processing program, the document would most likely be displayed in a window panel similar in size to window panel 150. There may be several auxiliary window panels, such as window panel 140, placed around the border of the primary window panel 150. Auxiliary window panel 140 is typically an application specific window panel that contains data tailored for the application and may also include icons representing functions tailored for the specific application, or directory, as in the example in FIG. 1. Window panel 140 contains a directory specifically for the Krakatoa Home Page allowing the user to choose other pages in the Web site. As shown, window panel 160 is sufficiently large to show all the contents within the panel to the user. In this example, the width of the window panel is a little wider than the length of the longest line in the pane: "Krakatoa Home Page."

As described above, window 110 includes three window panels of various sizes and utility. Also shown in window 110 is a pointer 170 whose movement is controlled by the user. In FIG. 1, the user begins by moving the pointer 170 into auxiliary window pane 140. Window pane 140 contains a directory of pages 160 for the "Krakatoa Home Page" 180 which is shown within a bordered rectangular area. In other examples, "Krakatoa Home Page" 180 could be highlighted or shown in bold. It should be noted that in the described embodiment, the content of primary window pane 150 corresponds to the item or page chosen in auxiliary window pane 140. For example, the "Krakatoa Home Page" content is displayed in window pane 150. The user can choose one of the directory items 160 from under "Krakatoa Home Page" 180 by moving the pointer 170 to the directory item and "clicking" on that item using a hardware device such as a mouse or roller.

Figure 2:
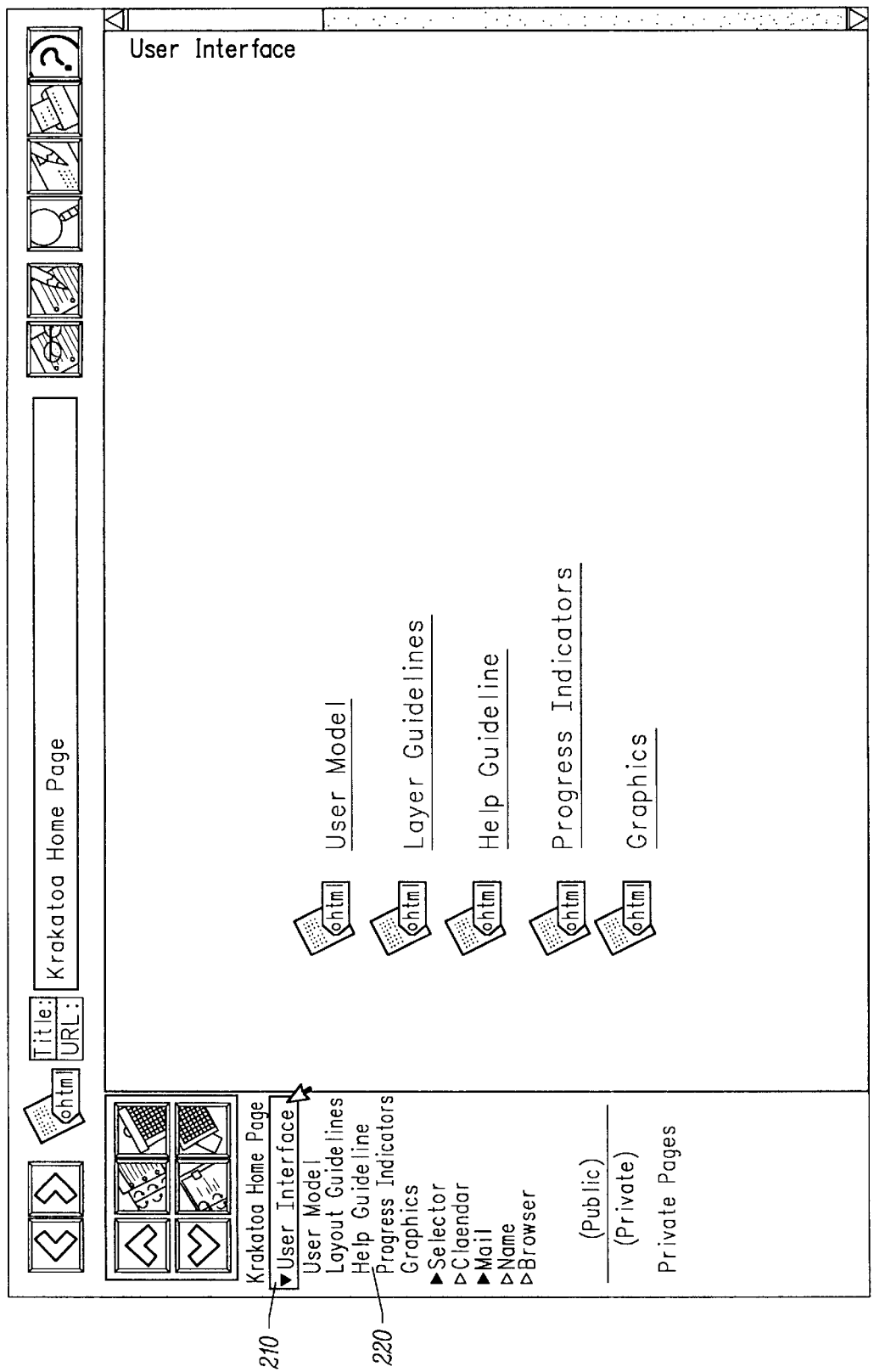
FIG. 2 is an illustration showing the same window shown in FIG. 1 with one of the small window panels expanded and, thereby, covering a small portion of an adjacent larger window panel.

FIG. 2 shows the user moving the pointer 170 to the "User Interface" item 210 in the directory 160. By "clicking" on this item, the user opened the "User Interface" page which is now contained, partially covered, window panel 150. Under "User Interface" are five new directory items 220 available to the user. The longest item in the new list, "Progress Indicators," is approximately three characters longer to the right than the previous longest line, "Krakatoa Home Page" 180, which determined the necessary width of auxiliary window panel 140 in FIG. 1. However, after choosing directory item 210 "User Interface," window panel 160 expanded to the right thereby expanding window panel 140. Panel 140 expanded so the user could read all of new directory items. The expanded window panel 140 is approximately three or four characters wider and five lines longer than its default size. This allows the user to see the new content in its entirety. As a result of this expansion, window panel 150 became partially covered.

Window panel 150, which now contains the "User Interface" page, is now partially covered on the left side. As will be described in more detail below, the size of panel 150 did not appear to contract in size. Rather, panel 150 became partially covered by panel 140 (in this example by a very small amount). Another point regarding window panel 140 is that it did not expand upward into tool panel 120 because, in this example, the Web site developer most likely made this panel a restricted area that may not be covered or altered.

Figure 3:
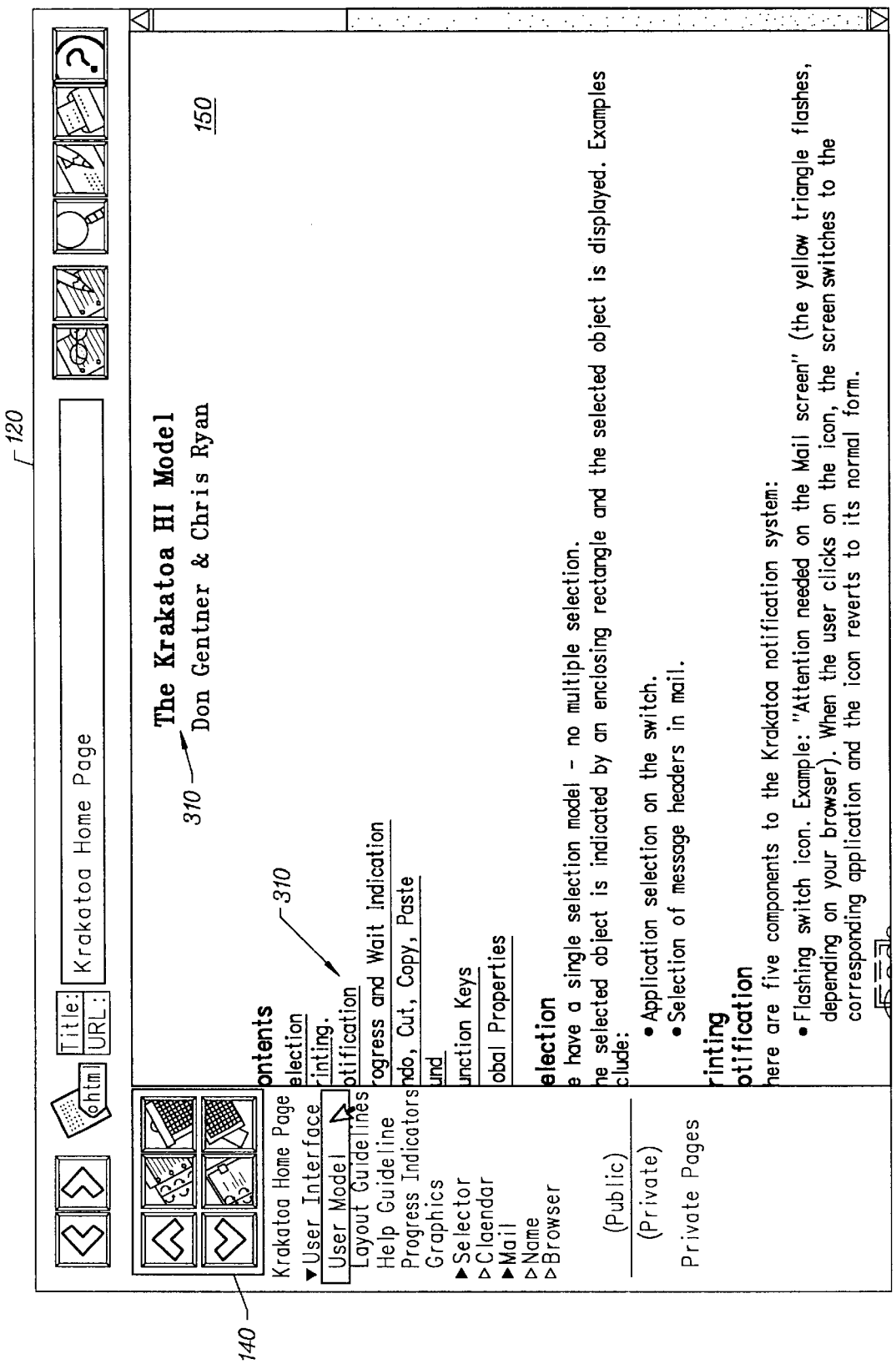
FIG. 3 is an illustration showing the same window as shown in FIGS. 1 and 2 with the content of the large window panel containing different content and showing more explicitly how much of the content in the large panel is covered as a result of the expansion first shown in FIG. 2.

In FIG. 3 the user moved the pointer 170 back into panel 140 and chose "User Model" from directory 220. Unlike "User Interface," "User Model" did not open any further directories or expose any additional content. Thus, panel 140 did not have to change size. The content 310 corresponding to the "User Model" page is displayed in the partially covered window panel 150. As FIG. 3 shows more clearly, the left portion of content 310 in panel 150 is partially covered by expanded window panel 140. This is because the user is still in panel 140 as indicated by the pointer 170. Normally, the user keeps the pointer in a window panel she wants to access at that time. In this example, the user wanted to pull up data contained in the "User Model" page and consequently moved the pointer 170 to that directory item. Now that the "User Model" data has been retrieved and is displayed in the primary, yet partially covered panel 150, the user's attention turns to this panel.

Figure 4:
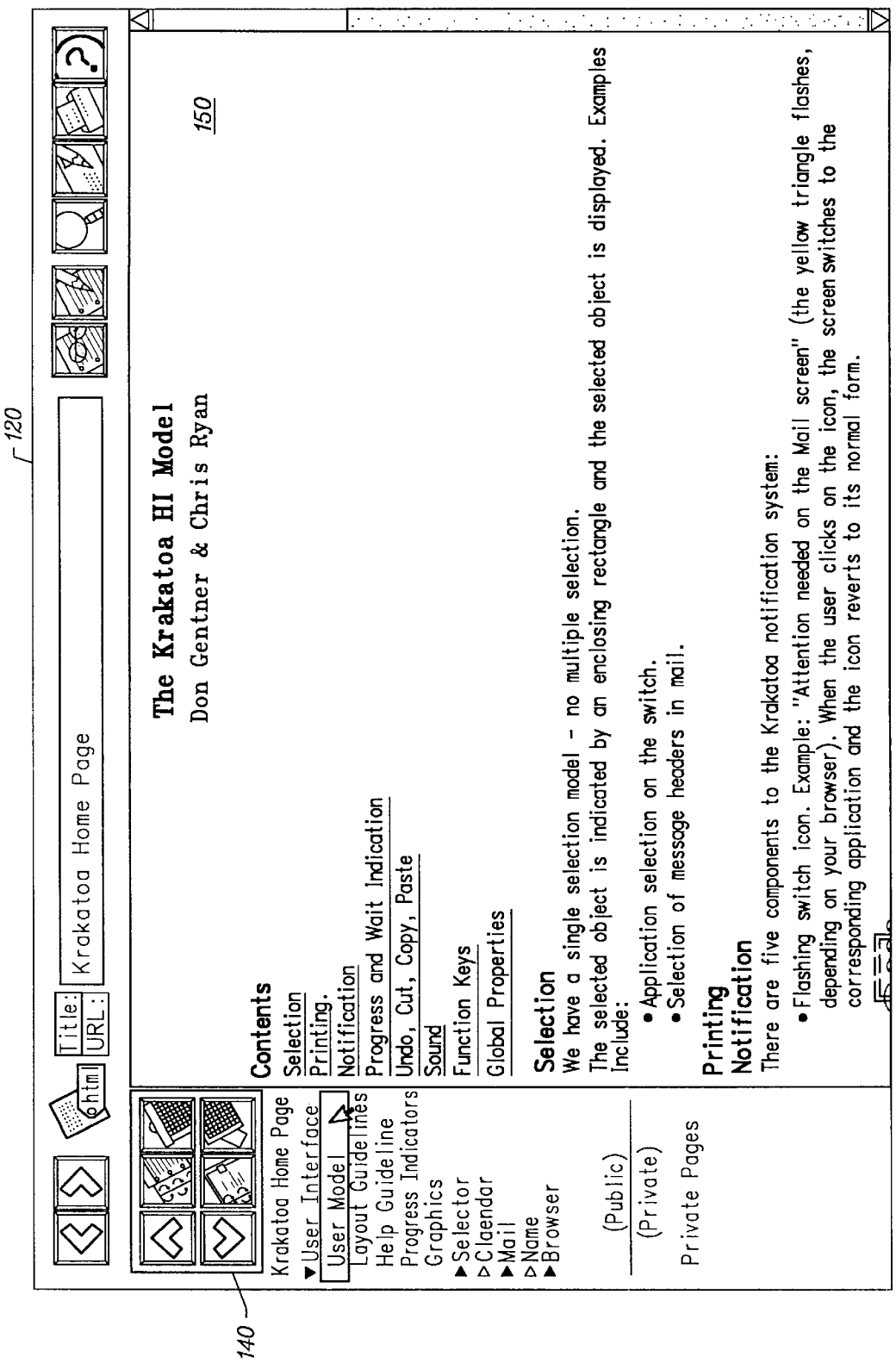
FIG. 4 is an illustration showing the same window as shown in FIGS. 1–3 with the pointer having moved from the small window panel to the larger window panel thereby causing the expanded panel to contract to reveal previously hidden content in the larger panel.

In FIG. 4, the user has moved the pointer 170 from expanded window panel 140 to window panel 150. Once the pointer 170 is within the partially covered panel 150, panel 140 contracts, thereby allowing panel 150 to display all the previously covered content 310 on the left side of the panel 150, thus allowing the user to see lines of text in their entirety. Because panel 140 contracted to reveal the content 310 in its entirety, the content of panel 140, and in particular directory items 220, are now partially hidden on the right. The content of the partially covered panel 140 has not been shifted or reformatted (i.e. it has not been moved). The user is now focused on expanded window panel 150 which expanded to reveal its previously covered content 310 on the left. Similar to the limit placed on panel 140 by tool panel 120 described in FIG. 1, expansion of window panel 410 is also limited by tool panel 120.

When the user is done working with the content 310 in panel 150, one option is for the user to move the pointer 170 back into partially covered panel 140. Once this is done, panel 140 will be uncovered and panel 150 will once again be partially covered. Changes to the actual sizes of window panels based, for example, on a certain user action, take place to expand a window panel to show underlying content or to contract a panel when content no longer needs to be displayed. This functionality and the operations and functions referred to above are described in more detail in the accompanying flowcharts and discussion below. In any event, the window panel will expand to uncover all hidden content or to the maximum possible size, which ever is smaller. Thus, any content in affected window panels is not shifted, compressed, or reformatted as a result of window panel expansion. Whatever content was covered upon expansion is now uncovered.

Figure 5:
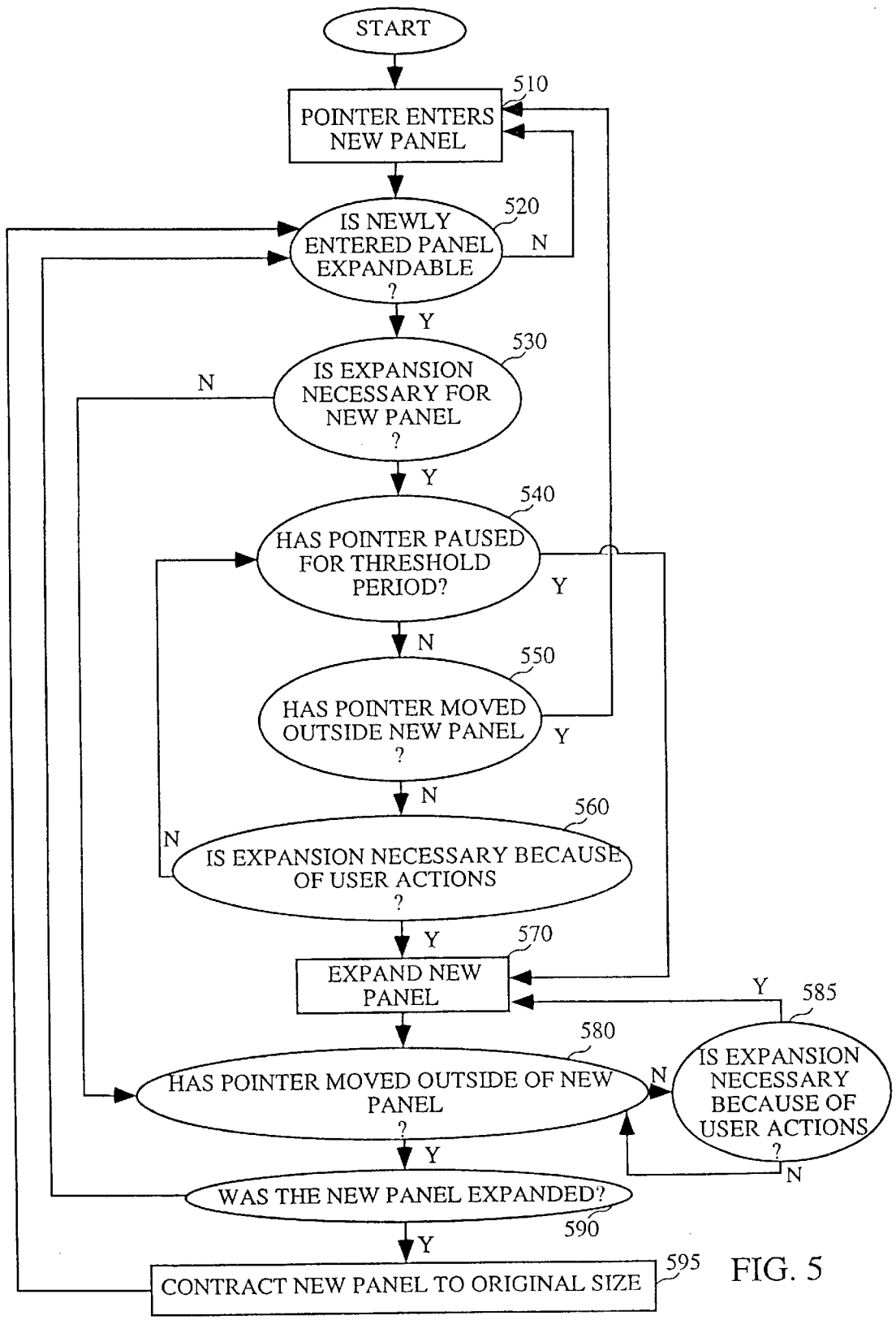
FIG. 5 is a flowchart illustrating a method of expanding and contracting a window panel in accordance with one embodiment of the present invention.

FIG. 5 is a flowchart illustrating a method of expanding and contracting a window panel in accordance with one embodiment of the present invention. In step 510, the user moves a pointer into a new window panel. The pointer can be any indicator or locator on the computer screen whose movement is controlled by the user through a hardware device such as a mouse, roller ball, pointer device, or keyboard. The user moves the pointer to a window panel if there is some content in that panel the user wants to access. For example, the content may be simple text in a word processing document or a menu of general editing functions the user may want to perform on a document. The pointer enters a new panel once it crosses the frame or boundary surrounding the window panel. In the described embodiment, the frame defines the shape of the panel and can function as an outside border of the panel. Once the pointer crosses or jumps this boundary, the user can manipulate the content within the panel by, for instance, placing a cursor in the text or "clicking" on a menu or directory item in that window panel. In an alternative embodiment, the system keeps track of the pointer's location through the use of coordinates thus making a frame unnecessary for determining when the pointer has moved in or out of a window panel.

Once the pointer has entered a new window panel, a check is made to determine whether the new panel is expandable in step 520. If the window panel is at its maximum size or is otherwise a restricted panel that is not expandable, the determination in step 520 will be that the newly entered panel can not be expanded and the logic will return to step 510 to wait for the pointer to enter the next new panel. The maximum window panel size is the size of the full window, or it may be set by a user or developer, as in the window shown in FIG. 1, at a size less than the full size of the window. In that figure, tool panel 120 also restricted the size of adjacent window panes. The user may also set a maximum expansion size of a particular panel so that data in nearby panels that the user considers important or data the user believes should never be covered by another panel is always exposed. Typically, auxiliary window panes can expand to uncover all hidden content without invading restricted areas. In the described embodiment, tool panel 120 is not expandable. The user or the system designer may also want to set the maximum size of an auxiliary window pane so that the primary window pane will never be covered more than a certain amount. The user may also want to do this so that important content, according to the user, is never covered. If the new panel is not expandable, control goes back to step 510 and there is no more processing until the pointer enters a new window panel. If the panel is expandable, control transfers to step 530.

In step 530, the system determines whether the current window panel needs to be expanded. The content contained within different window panels can vary in form and length. Similarly, window panel sizes can vary widely as well. Thus, in many circumstances, it is not necessary to expand a newly entered panel. In the described embodiment, a panel need only be expanded if there is hidden or covered content. If it is determined in step 530 that the current window does not have any hidden content when the pointer is moved into the panel, the panel will not expand. At this stage, the system checks to see if the user has moved the pointer outside the window panel as described in step 580. If it is determined in step 530 that there is hidden content, expansion is necessary and control passes to step 540.

If a window panel is expandable and the user wants expansion, the panel will expand if the pointer is quiescent in the panel for a threshold period. In one embodiment, this threshold period is in the range of approximately 0.1 and 1 second. That is, when the threshold period is set at 0.1 second, the pointer must be stationary for at least 0.1 second in the panel before the panel expands. If the trigger period is set to 1 second, the pointer must be stationary for at least 1 second in the panel before the panel expands. In a preferred embodiment, the threshold time is set in the range of approximately 0.2 to 0.5 seconds. Thus, moving the pointer across a frame into a window panel will not automatically expand the panel. The pointer must be stationary for a certain expansion time period before the system will expand the panel. This feature is useful given that in some instances there may be several panels close to one another within the window. It may be necessary to move the pointer from a window panel on the far right side of a window to a panel on the far left side thus requiring movement of the pointer over several panels in between which the user does not want to access at that time. If there was no threshold period, all the window panels between the far left and far right panels would expand once the pointer moved into them. This would cause unnecessary processing by the system and distracting activity on the screen. Constantly expanding and contracting panels across the screen would cause excessive visual "noise" and create generally undesirable rapid and sudden activity on the screen. The limitation of having an expansion time period allows the system to avoid unintended window panel expansion and allows the user to expand only the window panel the user is interested in accessing at that time.

If the pointer has not paused for the threshold period as determined in step 540, the system determines whether the pointer has moved out of the window panel as shown in step 550. On the other hand, if the pointer has paused for the threshold period as determined in step 540, the system expands the window panel in step 570, and shown in further detail in FIG. 6, so that any hidden content is revealed.

Returning to step 540, if the pointer has not paused for the threshold period the system determines whether the pointer has moved out of the panel in step 550 by checking if the pointer has jumped or crossed the window panel frame. If the pointer has moved out of the panel, control returns to step 510 and the process begins where the pointer enters a new panel. In most instances, if the pointer has not paused for the threshold period in the window panel, it is likely that the user was simply moving the pointer across the panel to access another panel. In this case, control transfers to step 510 in which the pointer enters a new window panel. If the pointer has not moved out of the panel, control is transferred to step 560. At this stage the system determines whether expansion is necessary because of user actions.

Figure 6:
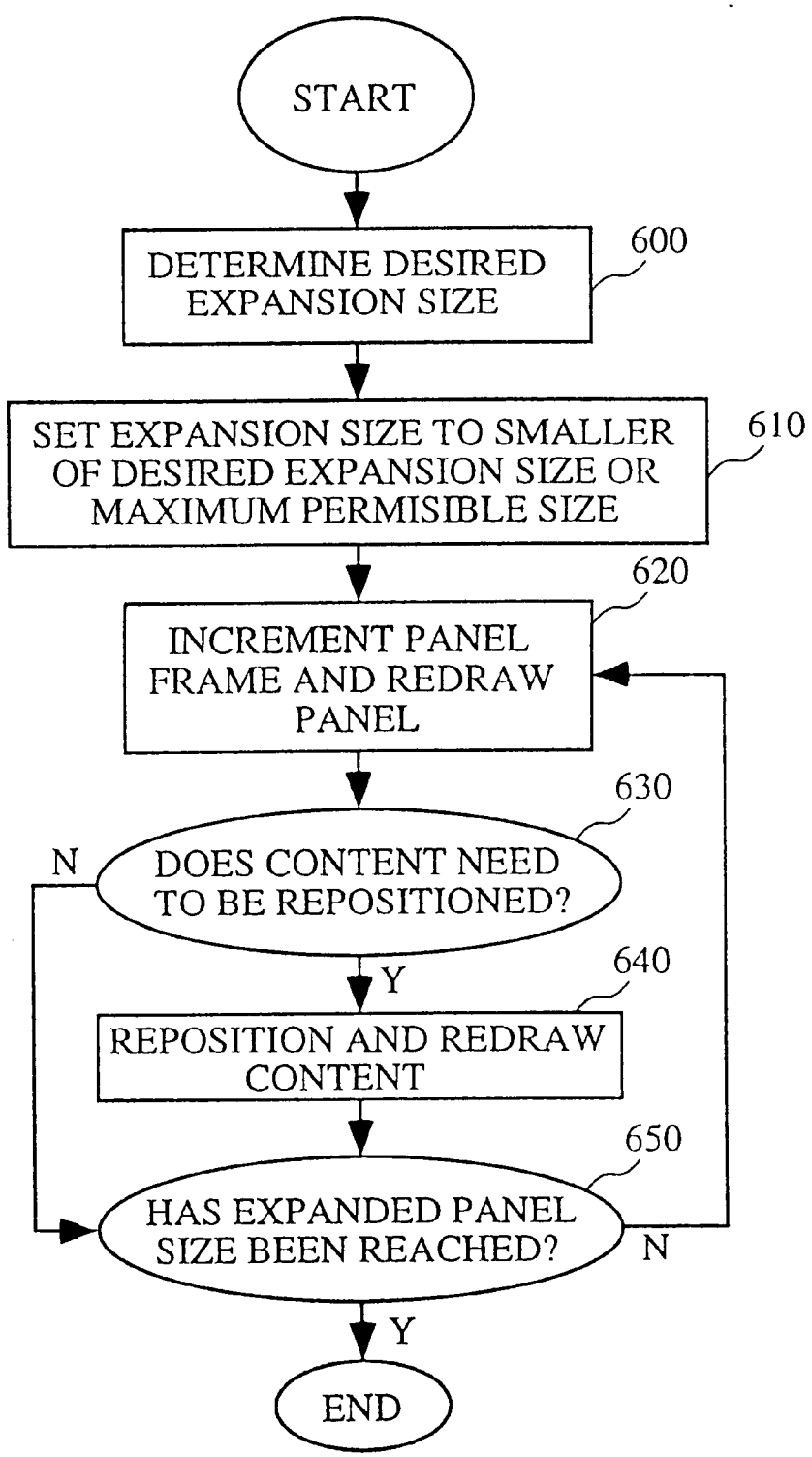
FIG. 6 is a flowchart showing the window panel expanding step 570 of FIG. 5 in further detail.

An example of a user action in the context of step 560 is shown in FIG. 2. There the user clicked on the "User Interface" directory item 210 thereby opening subdirectory 220. This caused window panel 140 in FIG. 1 to expand as shown in FIG. 2. If the user's actions require that the window panel expand further, control is transferred to step 570 and the system expands the panel, if permitted. If the user has not done anything that requires expansion, the system again checks in step 540 if the pointer has paused for the threshold period. FIG. 6 shows the expansion process that takes place in step 570 in further detail.

Once the window panel has been expanded in step 570, the system checks to see if the pointer has been moved out of the panel in step 580. If the pointer has not moved out of the panel, control continues with step 585 where the system checks to see if the user has acted within the window panel requiring that the panel expand further. The system continues to check whether expansion is necessary because of user actions in step 585 and whether the user has moved the pointer out of the new panel in step 580 until the pointer has been moved out of the panel. The content of a window panel may be stored in several layers or branches. For example, a panel may contain a list of menu items some of which may be submenus. An initial expansion of a panel may reveal all the text of the top-level menu items. Using the example from FIGS. 1–4, the directory item "User Interface" 210 contained a subdirectory 220 which in turn contained further items. The initial expansion set the window panel frame to the right of "Progress Indicators," the longest line in the subdirectory. The user's choices may not stop at this level. The user may have further options after clicking on or choosing an item from this directory. A list of subdirectory items might appear to the right of the initial item. The panel will then expand further to reveal the full text of the options available to the user at this level.

Further expansion of a window panel is also likely if the panel were more graphic-oriented than text-oriented. A graphic-oriented panel could contain several icons and may need to be expanded to show others. If the user chooses one of the icons, further icons or text may appear, all of which would likely require further expansion of the panel resulting from the user activity.

It should be kept in mind that panel expansion is not only useful in cases where there is one primary panel and several auxiliary panels, as described in the examples above. Initial and subsequent panel expansion is also useful when the panels all have equal relevance or importance to the user. For example, there may be four panels where each panel occupies one-quarter of the window. It is foreseeable that some of the panels would have several layers of data or content, and accessing each successive layer would require expanding the panel. Another scenario is that the window panels contain text where each line of text is longer than the width of the panel. In these instances, it is convenient to expand the panel so that the entire line of text is visible to the user.

In step 580, the system checks to see if the pointer has moved out of the selected panel. If it has, the system checks in step 590 to see if that window panel was expanded. If the panel was expanded, the system contracts the size of the panel to the size before the initial expansion (i.e. its default size). In the described embodiment, the contraction is triggered once the pointer moves across the frame and has moved out of the panel. The window panel contracts to its default size regardless of whether the user has altered, reformatted, or added content within the panel.

If, in step 580, the pointer has not moved out of the new panel, the system checks to see if expansion is necessary because of user actions in step 585. If expansion is not necessary at this stage, the system checks if the pointer has moved out of the new panel in step 580. This loop, which can also include step 570 if expansion is necessary, is performed until the pointer moves out of the panel. Step 585 is distinguishable from step 560 in that if expansion is necessary in step 585, the system, at this stage, does not check whether the pointer has paused for a threshold period as the system does in step 560. By the time the system has reached step 585, the panel has already expanded once either from user actions (step 560) or initial expansion (step 540), or because no initial expansion was needed. At this stage, the system will expand the panel because of user actions without waiting for the threshold period.

While user actions within the panel may cause expansion, in the described embodiment, actions by the user within the panel will not cause the panel to contract. Thus, if the window panel expands because of user actions within the panel in steps 560 and 585, such as opening a subdirectory, the panel will not contract when that subdirectory is closed. Once the window panel expands, whether just once or in stages because of user actions, the panel does not contract in stages. It contracts once directly to its default size when the pointer leaves the panel. Frequent expanding and contracting of the window panel causes, generally, rapid and sudden changes to the content and format of the panel. These unnecessary changes can be distracting to a user who is interested in accessing the panel's content at that time. Once the window panel contracts, the operation is complete and the system determines whether the newly entered panel is expandable in step 520.

FIG. 6 is a flowchart showing the window expanding step 570 of FIG. 5 in further detail. Step 570 requires determining to what extent a panel should be expanded and the process of repositioning content if necessary. In step 600, the system determines what the desired expansion size is for the window panel. One desired expansion size would be a size sufficiently large to reveal all hidden content in the panel. This desired size may exceed the maximum allowable size for the panel, in which case the smaller of the two determines the panel size in step 610. The maximum size may be set according to external limitations such as the size of the window containing the panel or by the system developer or user-imposed limitations.

In the described embodiment, the window panel expands horizontally or vertically. Thus, if the panel expands to the right of the screen it will not expand upward or downward. Similarly, if the panel expands upward or downward, it will not expand to the left or right. In the example shown in FIGS. 1–4 panel 140 has an upper limit set at the default size and a side border that is expandable. In the preferred embodiment, the panel size is expandable both horizontally and vertically as needed, limited by user-imposed restrictions, the window size, or by restricted window panels, such as tool panel 120 in FIG. 1.

Once the expansion size is determined in step 610, the system begins the process of redrawing the window panel frame to the new size starting with step 620. When the user moves the pointer to a new expandable panel, there are several ways the panel can expand and the content within the panel be repositioned. In the described embodiment, the redrawing of the panel frame is done through a successive series of steps called transitional animation.

In transitional animation the window panel frame is repeatedly increased a small amount and redrawn until the desired size is attained. The entire animation sequence should complete in a set amount of time, such as 0.3 seconds. Thus, for example, there is a dynamic calculation (based on the speed of the computer) that calculates the new position of the frame whereupon the system expands the frame to that position as shown in step 620. The system will repeat this operation until the panel frame has expanded to its new size. With this type of animation, there is typically a slow-in and slow-out period. That is, the expansion is performed using somewhat smaller size differences when the frame first begins to expand and when the frame approaches the desired (or maximum) expansion size than during the rest of the expansion process. After each successive calculation (i.e. each small increase in frame size) performed in step 620, the system in step 630, determines whether the content of the window panel needs to repositioned. If it does need to be repositioned, the system does so in step 640. In step 650, the system checks if the window panel has reached its expanded size. If it has not, control returns to step 620 where the panel is incremented again and redrawn. If the maximum or desired size has been reached, the operation is complete. Thus, the operation loop is as follows: 1) the panel frame is increased a small amount in a short time; 2) if the panel content needs to be repositioned because of the small increase in panel size the system determines what the new position should be and redraws the content; 3) the system then checks if the expansion size has been reached; 4) if it has, the operation is complete; and 5) if not the frame is incremented and redrawn again. This is done until the window panel reaches its new size.

By performing this loop rapidly, the window panel expansion has the visually appealing effect of being "rolled out" such that the user can see increasing portions of the content as the panel is expanding. Reformatting the panel content during the loop adds to this appealing effect. If the content needs to be shifted a little in one direction, for instance, to make it centered or left-justified (i.e. formatted properly in the panel), this is done in small steps along with the resizing and redrawing of the window panel, adding to the overall fluidity and continuity of the expansion process. The need to reposition and redraw the panel content may arise because when the panel is at its default (smallest) size the user should be able to see as much useful information as possible. The position of the content when the panel was expanded will most likely not meet this requirement. Thus, with textual content, the beginning of the text should be as far to the left of the panel as possible so the user can see as much of the beginning of the text as possible. When the panel expands to uncover all hidden content, the left margin may be increased according to the right margin (i.e. fully justifying the content) or other factors such as the size of the panel or the remaining content.

Figure 7:
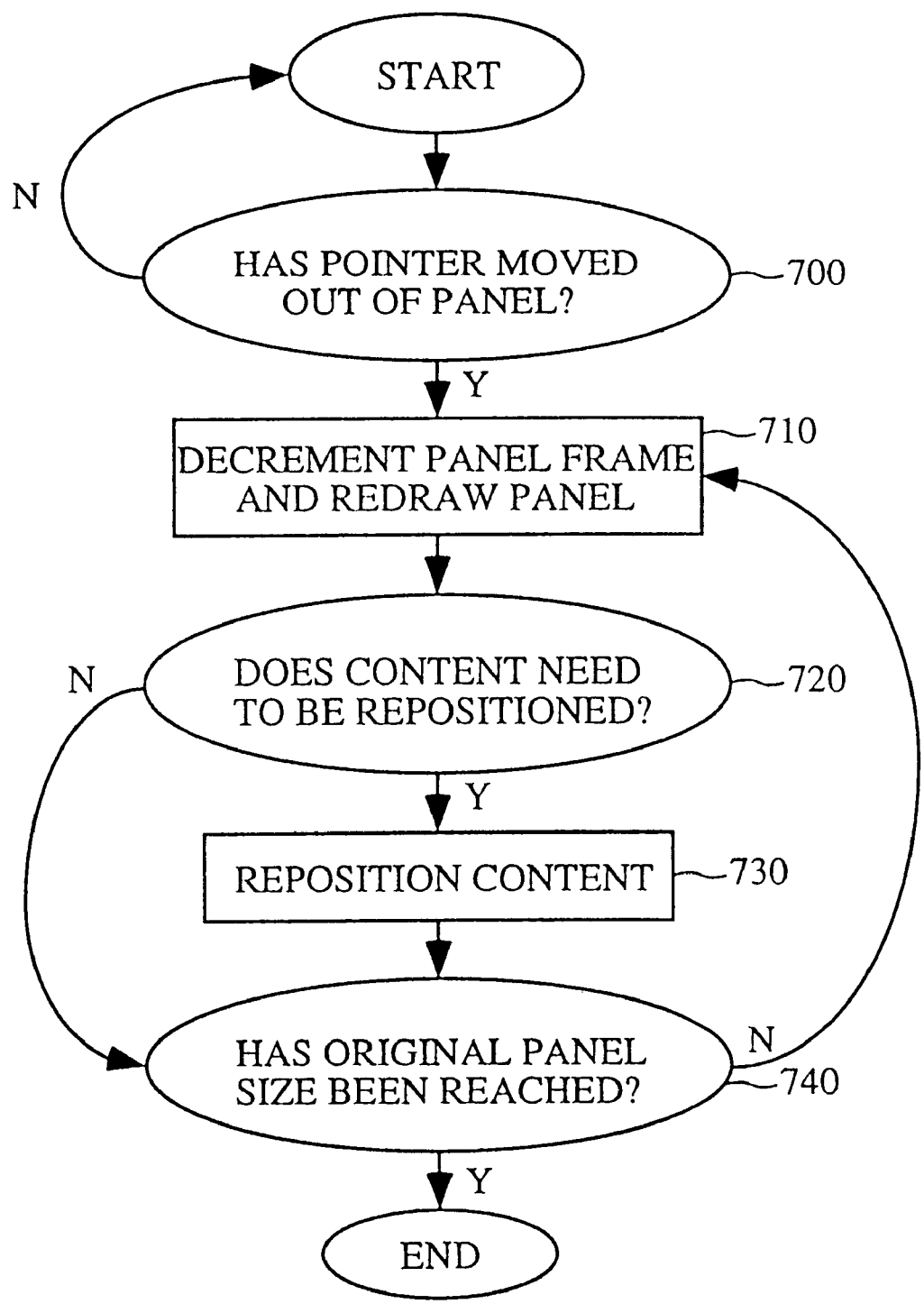
FIG. 7 is a flowchart showing the window panel contraction step 595 of FIG. 5 in further detail.

As mentioned above, the window panel contracts in step 595 once the pointer has been moved out of the panel, assuming the panel expanded. FIG. 7 is a flowchart showing the window panel contraction step 595 of FIG. 5 in further detail. The contraction process also uses transitional animation. The same loop involving steps 620 through 650 of FIG. 6 is essentially performed in reverse for the contraction process. In step 700, the system checks if the pointer has been moved out of the window panel. If the pointer has not moved, the window panel does not contract and the system continues to check if expansion is necessary because of user actions as shown in step 560 in FIG. 5. If the pointer has moved, in step 710 the panel frame is decremented by a small amount and redrawn. In step 720, the system checks if the content needs to be repositioned given the small reduction in the size of the panel. If the content needs to be repositioned, the system does so in step 730. If not, the system checks if the panel size has been reduced to the original or default panel size. If it has, the operation is complete. If not, control returns to step 710 and the window panel frame is further decremented a small amount. Because the contraction process also uses transitional animation, it provides the same visually appealing affect to the user as when the panel is expanding. The panel is rolled in similar to it being rolled out. Once the contraction process is complete, the system returns control to step 520 of FIG. 5 where it checks to see if the newly entered panel is expandable.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 8:
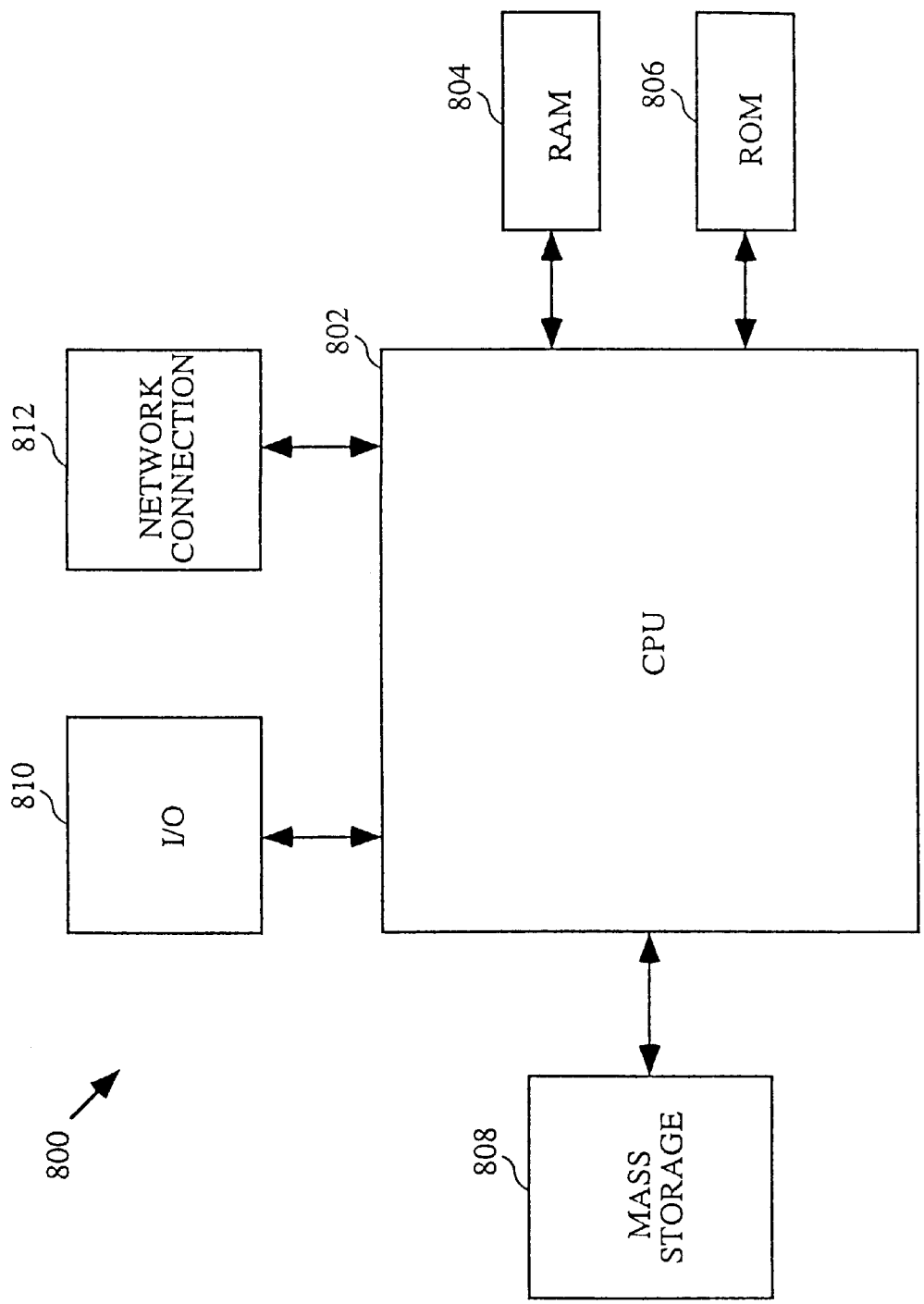
FIG. 8 is a schematic illustration of a general purpose computer system suitable for implementing the present invention.

FIG. 8 is a schematic illustration of a general purpose computer system suitable for implementing the present invention. The computer system includes a central processing unit (CPU) 802, which CPU is coupled bidirectionally with random access memory (RAM) 804 and unidirectionally with read only memory (ROM) 806. Typically RAM 804 includes programming instructions and data, including text objects as described herein in addition to other data and instructions for processes currently operating on CPU 802. ROM 806 typically includes basic operating instructions, data and objects used by the computer to perform its functions. In addition, a mass storage device 808, such as a hard disk, CD ROM, magneto-optical (floptical) drive, tape drive or the like, is coupled bidirectionally with CPU 802. Mass storage device 808 generally includes additional programming instructions, data and text objects that typically are not in active use by the CPU, although the address space may be accessed by the CPU, e.g., for virtual memory or the like. Each of the above described computers further includes an input/output source 810 that typically includes input media such as a keyboard, pointer devices (e.g., a mouse or stylus) and the like. Each computer can also include a network connection 812 over which data, including, e.g., text objects, and instructions can be transferred. Additional mass storage devices (not shown) may also be connected to CPU 802 through network connection 812. It will be appreciated by those skilled in the art that the above described hardware and software elements are of standard design and construction.

What is claimed is:

1. In a computer system that includes a display monitor that is configured to display a window that has a plurality of window panels wherein each one of the plurality of window panels can temporarily overlap another one of the plurality of window panels, a method of changing a default size of a selected one of the plurality of window panels displayed in the window without causing any adjacent window panels to resize, the method comprising:

detecting when a pointer has been quiescent within a selected window panel for at least a threshold time period;

determining whether the selected window panel is in condition to be expanded;

enlarging the selected window panel thereby creating a temporarily expanded window panel when it is determined that the pointer has been quiescent within the selected window panel for at least the threshold time period and it is determined that the selected window panel is in condition to be expanded, such that when the selected window panel is temporarily enlarged, adjacent window panels are not contracted thereby causing a temporary overlap of one or more of the adjacent window panels by the selected window panel; and contracting the selected window panel to a default size.

2. A method as recited in claim 1 wherein the threshold time period is in the range of approximately 0.1 to 1 seconds.

3. A method as recited in claim 2 wherein the threshold time period is in the range of approximately 0.2 to 0.5 seconds.

4. A method as recited in claim 1 wherein the step of determining whether the window panel is in condition to be expanded is based at least in part on a determination of whether the selected window panel contains hidden content.

5. A method as recited in claim 4 wherein the step of determining whether said window panel is in condition to be expanded is further based on a determination of whether a user action has caused the selected window panel to contain content that would be hidden at a current window size.

6. A method as recited in claim 1 wherein the step of enlarging the selected window panel further includes the steps of determining a desired expansion size;

determining a maximum permissible expansion size of the selected window panel; and wherein the selected window panel is enlarged to an expanded window panel determined by the smaller of the desired expansion size and the maximum permissible expansion size.

7. A method as recited in claim 1 wherein the step of enlarging the selected window panel further includes redrawing a panel frame that defines a boundary of the selected window panel to a position corresponding to the expanded window panel.

8. A method as recited in claim 1 further comprising the steps of:

determining whether any content in the selected window panel is to be repositioned during expansion; and redrawing the content of the selected window panel at a new position.

9. A method as recited in claim 1 wherein the step of contracting the selected window panel further comprises the steps of:

detecting when the pointer has been moved out of the selected window panel; and redrawing the panel frame to the default size.

10. A method as recited in claim 1 further comprising the steps of:

determining whether the content of the selected window panel is to be repositioned during contraction; and redrawing the content of the selected window panel to a new position.

* * * * *

UNITED STATES PATENT AND TRADEMARK OFFICE
CERTIFICATE OF CORRECTION

PATENT NO. : 5,943,053
DATED : August 24, 1999
INVENTOR(S) : Frank E. Ludolph, et al.

It is certified that error appears in the above-identified patent and that said Letters Patent is hereby corrected as shown below:

Column 1, line 67, replace "comers" with --corners--

Signed and Sealed this

Ninth Day of May, 2000

Attest:

Q. TODD DICKINSON

Attesting Officer

Director of Patents and Trademarks